United States Patent Office 3,553,103
Patented Jan. 5, 1971

3,553,103
PREPARATION OF ZEOLITE CATALYSTS
Bernard Whiting Burbidge, Leatherhead, and Ian Montgomery Keen, Ashford, England, assignors to The British Petroleum Company Limited
No Drawing. Filed Jan. 13, 1969, Ser. No. 790,829
Claims priority, application Great Britain, Jan. 29, 1968, 4,421/68
Int. Cl. C10g *13/02;* B01j *11/40*
U.S. Cl. 208—111          14 Claims

ABSTRACT OF THE DISCLOSURE

In the preparation of a catalyst of a Group VIII metal component and a decationised zeolite, the decationised zeolite is aged in water for at least 1 week, preferably at least 3 weeks, before being contacted with a solution containing Group VIII metal cations. The method assists in obtaining even distribution of the Group VIII metal throughout the zeolite while using a minimal excess of Group VIII metal cation in the contacting solution. The preferred zeolite is mordenite.

The catalyst may be used for hydrocarbon conversion, e.g., hydrocracking, hydrogenation, dehydrogenation, disproportionation isomerisation, and selective cracking of n-paraffinic hydrocarbons.

---

This invention relates to the preparation of zeolite catalysts containing Group VIII metal components.

Catalysts comprising a zeolite and a Group VIII metal component have been proposed for a number of uses including hydrocracking, isomerisation and selective cracking of n-paraffinic hydrocarbons. The zeolite is often in the decationised or hydrogen form and the Group VIII metal may be added by ion-exchange to the decationised zeolite. It is necessary to get even distribution of the Group VII metal throughout the catalyst particles if the catalyst is to show good and stable activity.

However, getting the Group VIII metal evenly distributed throughout a decationised zeolite presents problems. The decationised zeolite is contacted with a solution containing the Group VIII metal ions, but a straightforward contacting of dried, freshly prepared zeolite with the solution gives a rapid uptake of metal ions and a consequent bad distribution of the ions throughout the zeolite. There is some improvement if the zeolite is not dried before the ion-exchange but there is still a tendency to uneven distribution.

The rate of uptake may be slowed down by the addition of an acid such as hydrochloric acid to the solution but if this is done an excess of Group VIII metal ions has to be present in the solution to get the required loading. The excess ions have to be recovered, particularly if they are platinum group metal ions, and this is expensive.

It has now been found that ageing of a decationised zeolite in water before the Group VIII metal addition slows down the rate of uptake and that good uptake can be achieved with an aged zeolite using, preferably, a minimal excess of Group VIII metal ions over the amount necessary for the required loading.

According to the present invention, therefore, a method of preparing a catalyst comprising a Group VIII metal component and a decationised zeolite comprises forming a decationised zeolite, ageing the zeolite in water for at least a week and contacting the aged decationised zeolite with a solution contacting Group VIII metal cations.

Preferably the total quantity of Group VIII metal cations in the solution is not more than 120% wt. of the amount required to be exchanged onto the zeolite.

The ageing of the zeolite in water may be at least 3 weeks. The upper limit of ageing time is not critical and successful results have been obtained with zeolite aged in water for 1 year. In practice therefore, the upper limit of ageing depends on circumstantial limitations such as storage capacity for the aged zeolite.

The ageing may be at 0–30° C. and ½–2 atmospheres, particularly atmospheric temperature and pressure, so no special equipment or conditions are required.

The ageing slows down the rate of take-up of the Group VIII metal ions with which the zeolite is subsequently contacted and this contacting may be from 10 to 100 hours depending on the metal loading required. Preferably the total quantity of Group VIII meteal cations are not more than 110% of the amount required to be exchanged onto the zeolite, thereby giving at most a 10% excess which has to be subsequently recovered.

Decationised zeolite means a zeolite having a deficiency of metal cations. An alternative term in the art is hydrogen zeolite, since it is assumed that when metal cations are removed they are replaced by hydrogen ions. However, since it is not possible to detect the presence of hydrogen ions in zeolites, the precise structure remains in doubt. A cation deficiency can, on the other hand, be readily measured by analysis of the metallic elements present in the zeolite. In the decationised zeolite the residual metal cation content, for example the sodium cation content, may be less than 2% wt. of the zeolite and preferably less than 1.5% wt. of the zeolite.

Although the process of the present invention may be used with any zeolite, the preferred zeolite is mordenite, and, for convenience, the invention will be subsequently described with reference to this preferred zeolite.

Natural or freshly prepared synthetic mordenite has the formula

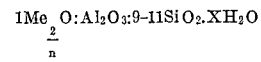

where Me is a metal cation, $n$ is the valency of the cation and X is variable between nil and 7 depending on the thermal history of the mordenite. Me is commonly sodium and in one common form of decationisation sodium mordenite is base exchanged with ammonium cations. The ammonium form is then heated to drive off ammonia, leaving behind the hydrogen form or decationised mordenite. According to the second method the mordenite may be treated with a mineral acid, for example hydrochloric or sulphuric acid, in order directly to decationise the mordenite. A combination of acid treatment and ammonium treatment can also be used.

Both these methods will decationise mordenite but they differ in other respects, particularly as regards their effect on the silica:alumina ratio of mordenite. Base exchange with ammonium cations followed by heating has no effect on $SiO_2:Al_2O_3$ ratio and treatment with acid is also ineffective if a weak acid (e.g., acetic acid) and/or a dilute acid solution (e.g. a solution of less than 5% wt.) is used.

Treatment with a strong acid for example sulphuric or hydrochloric acid, will however remove aluminium from the mordenite lattice thereby increasing the $SiO_2:Al_2O_3$ ratio to at least 14:1 and more particularly at least 16:1 depending on the strength of acid. The acid used may be from 5–50% wt. strength and preferably from 10 to 20% wt. strength. A single treatment or two or more successive treatments may be given with acids of the strengths stated above. A convenient method of treatment is to treat the mordenite with acid under reflux for a period of 2–12 hours. In specific examples $SiO_2:Al_2O_3$ ratios of as high as 90:1 have been obtained and a practical upper limit may thus be 100:1. Particularly preferred $SiO_2:Al_2O_3$ ratios are in the range 16:1 to 50:1. It should be emphasised that mordenites with higher than normal silica:alumina ratios retain the crystal structure of mordenite and are not significantly altered in terms of physical strength, stability or crystallinity.

After the acid treatment it is desirable to wash the mordenite thoroughly with water until it is free of acid anions.

The acid-treated, water-washed mordenite is then aged for at least a week as described above and contacted with the solution containing Group VIII metal cations.

The temperature of contacting may be from 0–120° C., preferably 0–80° C. Thus atmospheric temperature may conveniently be used. The time of contacting will depend on the length of time of the previous ageing, longer ageing times giving a slower uptake of the Group VIII metal cations. Convenient contacting times may be from 30 to 70 hours, the rate of uptake being conveniently followed by monitoring the decreasing metal content of the solution. As stated above the excess of Group VIII metal ions is desirably kept to a minimum, the quantity of ions in the solution being not more than 120% and preferably not more than 110% of the quantity to be exchanged onto the zeolite.

Any convenient solution containing Group VIII metal cations may be used, preferably an aqueous solution. In the case of the platinum group metals, a solution of the platinum group metal chloride in aqueous ammonia may be used. The Group VIII metal ions are believed to form complexes with the water and/or the ammonia and the complex ion as a whole is believed to enter into the zeolite, and to be broken down on subsequent drying and calcination. The term Group VIII metal cations, as used in this specification, therefore, includes complexes containing such ions such as are normally formed in solution.

The preferred Group VIII metals are the platinum group metals, particularly platinum and palladium. The amount of the Group VIII metal exchanged on to the mordenite may be within the range 0.01 to 10% wt., particularly 0.1 to 5% wt. and more particularly 0.1 to 1.5% wt. However, iron group metals, particularly nickel, may also be used but in this case the size of the complex ion formed in solution is such that uptake may be slow and limited, particularly when mordenite is the zeolite. The temperature of contacting with iron group metals may thus be at the higher end of the range stated, e.g., 80–120° C. and the amount taken up at the lower end of the range stated, e.g., 0.1–1.5% wt.

After the contacting with the solution, the zeolite may be dried at 100–150° C. and calcined at 200–600° C. If necessary, the calcination temperature may be increased in stages. Since zeolites are sensitive to large amounts of water vapour and since sensitivity increases with increasing temperature it may be desirable to control and limit the water vapour content of the calcination atmosphere, which is preferably a flowing stream of air, particularly at temperatures of 300–600° C. The amount of water vapour that can be tolerated at any given temperature can readily be determined by experiment.

The dried calcined catalyst of a Group VIII metal component and a decationised zeolite has, as stated above, the Group VIII metal well distributed throughout the zeolite and, in consequence, shows particular effectiveness in catalytic reactions. The present invention, therefore, includes a process of hydrocarbon conversion comprising contacting a hydrocarbon feedstock at elevated temperature and preferably, elevated pressure, and in the presence of hydrogen with a catalyst of a Group VIII metal component and a decationised zeolite prepared as described above. Hydrocarbon conversion reactions known to be catalysed by such catalysts include hydrocracking (including dealkylation), hydrogenation, dehydrogenation, isomerisation, disproportionation and selective cracking of n-paraffinic hydrocarbons from mixtures containing them. The precise feedstocks used will depend on the process to be employed, but they are preferably hydrocarbons or mixtures of hydrocarbons derived from petroleum. Thus, for hydrocracking and selective cracking of n-paraffinic hydrocarbons the feedstocks may be petroleum fractions boiling in the range 60–600° C. preferably 250–550° C.; for dealkylation, fractions containing $C_7$–$C_{15}$ alkyl aromatics; for isomerisation, n-paraffins or alkyl aromatics or fractions containing them, particularly fractions boiling in the range 35–200° C.; for disproportionation, $C_7$–$C_9$ alkyl aromatics or fractions containing them; for hydrogenation, fractions containing cyclic or acyclic unsaturated hydrocarbons boiling within the range 30–370° C., more particularly 30–250° C. and for dehydrogenation, naphthenes and/or paraffins or fractions containing them, particularly those boiling within the range 30–250° C. With the preferred mordenite catalyst the catalyst is particularly suitable for use in the processes described and claimed in U.K. Patent No. 1,088,933. The ranges of process conditions that may be used are summarised in the following Table 1.

TABLE 1

| | Broad range | Hydrocracking (including dealkylation) | Selective cracking of n-paraffins | Hydroisomerisation | Disproportionation | Hydrogenation | Dehydrogenation |
|---|---|---|---|---|---|---|---|
| Temperature, °F | 150–1,100 | 450–1,100 | 450–950 | 350–700 | 600–1,100 | 150–750 | 800–1,100 |
| Pressure, p.s.i.g | 0–3,000 | 250–3,000 | 250–3,000 | 0–1,000 | 0–1,500 | 0–3,000 | 0–1,500 |
| Space velocity treating, v./v./hr | 0.1–20 | 0.2–10 | 0.2–10 | 0.2–10 | 0.1–20 | 0.1–20 | 0.1–10 |
| $H_2$/HC, mole ratio | 0.1–70:1 | 0.5–70:1 | 0.5–70:1 | 0.25–15:1 | 0.25–15:1 | 0.1–20:1 | 0–10:1 |

The invention is illustrated by the following example.

EXAMPLE

Sodium mordenite extrudate was decationised and increased in silica:alumina ratio by contacting it with 20% wt. sulphuric acid at 105° C. for 4 hours. The mordenite was then water washed at 15–30° C. for 26 hours, using frequent changes of washing water, until free of sulphate ions. A portion of the decationised mordenite was dried at 130° C. and calcined at 550° C. and found to have the following composition as compared with the original sodium mordenite.

| | Sodium mordenite | Decationised mordenite |
|---|---|---|
| Sodium, percent wt | 4.95 | 0.89 |
| Silicon, percent wt | 36.1 | 40.0 |
| Aluminium, percent wt | 6.54 | 5.3 |
| Molar $SiO_2$:$Al_2O_3$ ratio | 10.7 | 14.7 |
| Surface area, m.$^2$/g | 258 | 410 |
| Pore volume, ml./g | 0.13 | 0.21 |

The remainder of the decationised mordenite was stored under water at atmospheric temperature (20° C.) and pressure. Samples were drawn at intervals over a period of 10 weeks and contacted at atmospheric temperature with solutions of tetra-amine platinous chloride to give platinum-mordenite compositions containing approximately 0.55% wt. platinum. After the platinum exchange, each sample was dried at 130° C. for 16 hours and calcined in flowing dry air to 500° C. over 14 hours and maintained there for 3 hours. The samples were then tested for catalytic activity by processing a Kuwait wax distillate feedstock having an ASTM boiling range of 380 to 490° C., a pour point of 85° F., a sulphur content of 2.71% wt. and a nitrogen content of 650 p.p.m., under the following conditions:

Temperature—700° F.
Pressure—1000 p.s.i.g.
Space velocity—2.0 v./v./hr.
Hydrogen treating rate—10,000 s.c.f./b.
Duration—200 hours Catalytic activity was measured by the drop in pour point as between feed and product, and is expressed as the pour-point of unstabilised product taken at 200 hours on stream. Since n-paraffins are the main cause of high pour point, the tests, therefore, measured the activity of the catalyst for the selective cracking of n-paraffinic hydrocarbons.

TABLE 2

| Age of extrudates in days prior to Pt change | 1 | | 3 | 26 | 47 | 72 |
|---|---|---|---|---|---|---|
| | Dried particles | Undried particles | | | | |
| Platinum exchange: | | | | | | |
| Pt in solution, percent wt | 0.23 | 0.23 | 0.31 | 0.31 | 0.31 | 0.18 |
| HCl in solution, percent wt | 0 | 0 | 0.3 | 0 | 0 | 0 |
| Duration, hours | 17 | 17 | 17 | 17 | 54 | 40 |
| Finished catalyst: | | | | | | |
| Pt content, percent wt | 0.72 | 0.68 | 0.38 | 0.51 | 0.62 | 0.53 |
| Pt "distribution" | (1) | (2) | (3) | (3) | (4) | (4) |
| Pour-point of unstabilised product, °F | +10 | +5 | −5 | 0+5 | −10 | −10 |

[1] Shell (the metal was distributed as a thin "shell" without penetration to the interior of the particles).
[2] Ca. 50% penetration.
[3] Very good penetration.
[4] Complete penetration.

Table 2 above shows that the rate of take-up of the platinum cation by the dried, unaged mordenite (Column 1) was rapid and that this gave a poor platinum distribution and hence poor activity. This phenomenon is usually seen as a "shell" impregnation of metal on the finished catalyst particles. A somewhat improved platinum distribution and activity was obtained (see Column 2) by conducting the same exchange on the undried, unaged mordenite.

To cure the rapid uptake and consequent bad distribution of platinum, HCl was added to the solution in column 3. The rate of uptake was slowed down as shown by the lower platinum content and an active catalyst was obtained but a considerable excess of platinum was required.

Columns 4, 5 and 6 show catalyst preparations according to the present invention. After ageing under water for 26 days (Column 4), good distribution and reasonable activity was obtained without the need of added HCl to slow down the rate of uptake. Column 5 shows a further improvement over Column 4 by increasing the duration of the platinum exchange and Column 6 shows that a large excess of platinum is unnecessary. The excess of unused platinum in the solution at the end of the platinum exchange was only 8% wt.

We claim:

1. A method of preparing a catalyst comprising a Group VIII metal component and a decationised zeolite comprising forming a decationised zeolite, ageing the zeolite in water for at least a week and contacting the aged decationised zeolite with a solution containing Group VIII metal cations.

2. A method as claimed in claim 1 wherein the total quantity of Group VIII metal cations in the solution is not more than 120% wt. of the amount required to be exchanged onto the zeolite.

3. A method as claimed in claim 1 wherein the zeolite is aged in water for at least 3 weeks.

4. A method as claimed in claim 1 wherein the ageing in water is carried out at 0–30° C. and ½–2 atmospheres.

5. A method as claimed in claim 1 wherein the decationised zeolite has a residual metal content of less than 2% wt.

6. A method as claimed in claim 1 wherein the zeolite is mordenite.

7. A method as claimed in claim 6 wherein the decationised mordenite has a $SiO_2:Al_2O_3$ ratio of at least 14:1.

8. A method as claimed in claim 7 wherein the decationised mordenite has a $SiO_2:Al_2O_3$ ratio of 16:1 to 50:1.

9. A method as claimed in claim 7 wherein the mordenite is decationised by treatment with sulphuric or hydrochloric acid of from 5–50% wt. strength.

10. A method as claimed in claim 1 wherein the Group VIII metal is platinum or palladium, present on the catalyst in an amount of from 0.01–10% wt.

11. A method as claimed in claim 1 wherein the decationised zeolite is contacted with the solution containing Group VIII metal ions at 0–120° C. for 30–70 hours.

12. A process of hydrocarbon conversion comprising contacting a hydrocarbon feedstock at elevated temperature and in the presence of hydrogen with a catalyst in accordance with claim 14.

13. A process as claimed in claim 12 for the selective cracking of n-paraffinic hydrocarbons from mixtures containing them at 450–950° F., 250–3000 p.s.i.g., 0.2–10 v./v./hr. and 0.5–70:1 $H_2/HC$ mole ratio.

14. A catalyst for use in a process of hydrocarbon conversion, said catalyst comprising a Group VIII metal component and a decationised zeolite and having the Group VIII metal well distributed throughout the zeolite and, in consequence, showing particular effectiveness in catalytic reactions, said catalyst having been prepared by the method of claim 1.

References Cited

UNITED STATES PATENTS

| 3,259,564 | 7/1966 | Kimberlin, Jr., et al. | 208—111 |
| 3,367,885 | 2/1968 | Rabo et al. | 252—455 |
| 3,383,169 | 5/1968 | Young | 23—112 |
| 3,480,539 | 11/1969 | Voorhies, Jr., et al. | 208—111 |

D. E. WYMAN, Primary Examiner

C. F. DEES, Assistant Examiner

U.S. Cl. X.R.

252—455